June 7, 1932.  E. L. LANGLEY  1,862,224
APPARATUS FOR DECOMPOSING WATER
Filed Feb. 11, 1929  3 Sheets-Sheet 1
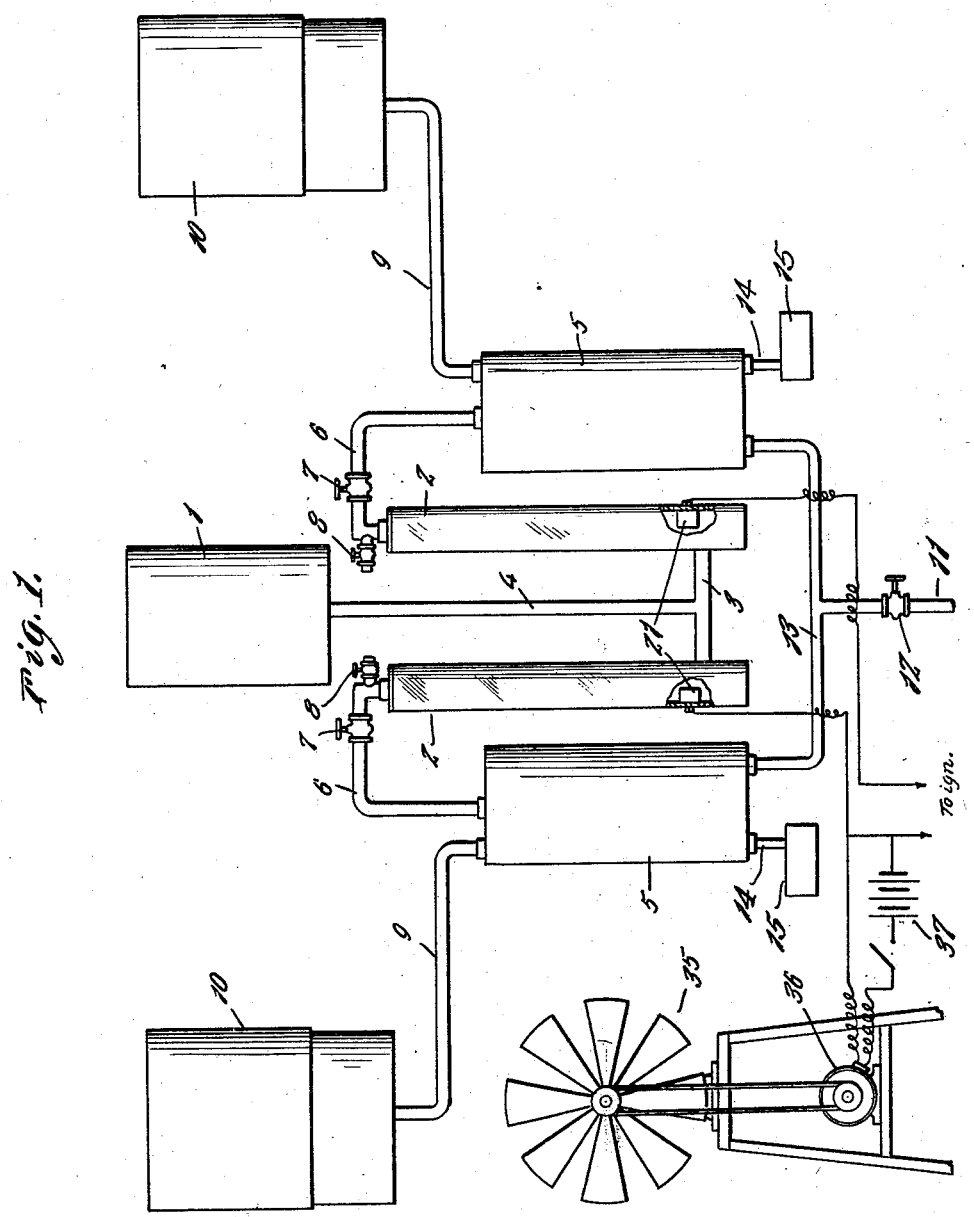
Inventor
E. L. Langley
By Clarence A. O'Brien
Attorney June 7, 1932.　　　E. L. LANGLEY　　　1,862,224
APPARATUS FOR DECOMPOSING WATER
Filed Feb. 11, 1929　　3 Sheets-Sheet 2
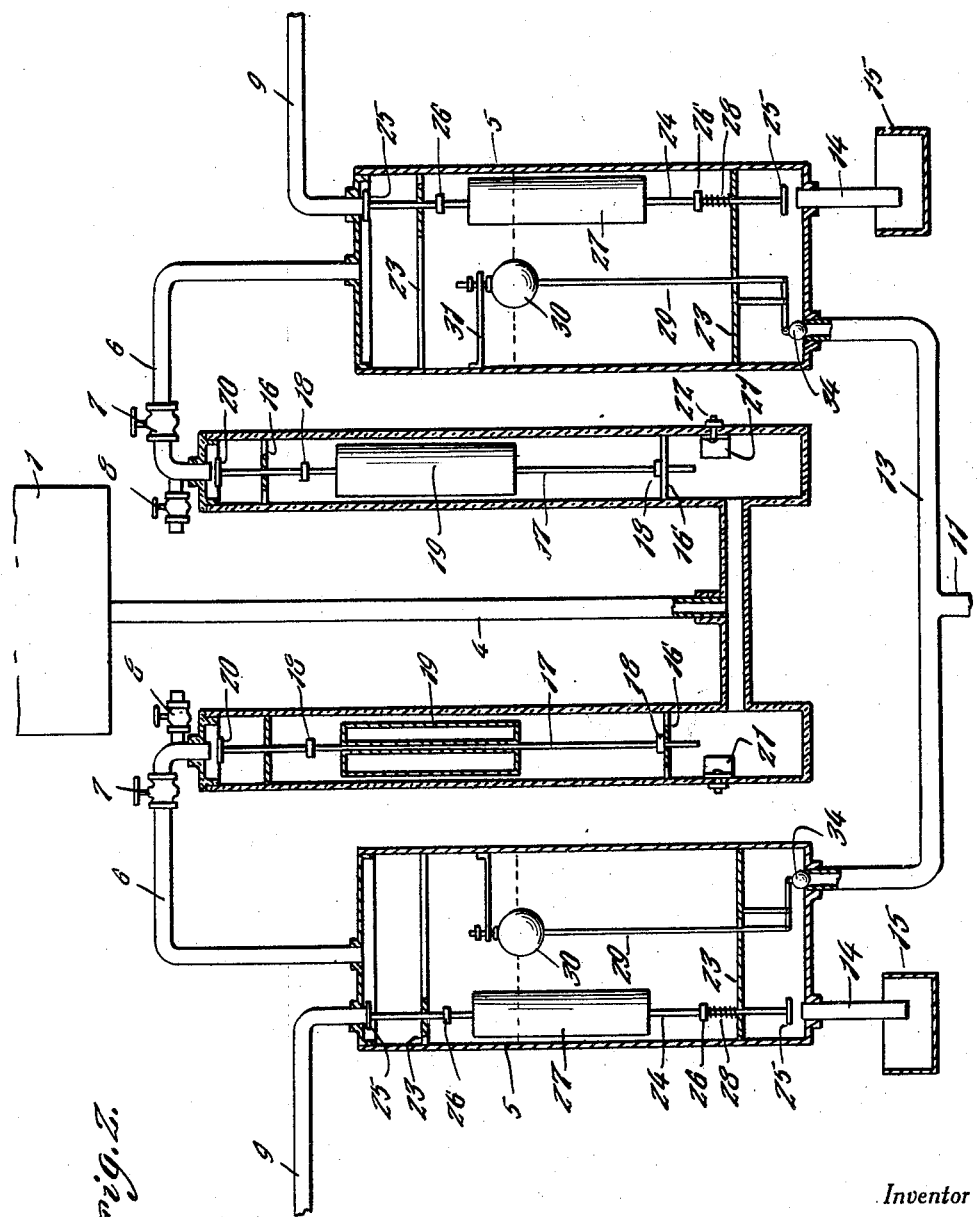
Inventor
*E. L. Langley*
By *Clarence A. O'Brien*
Attorney

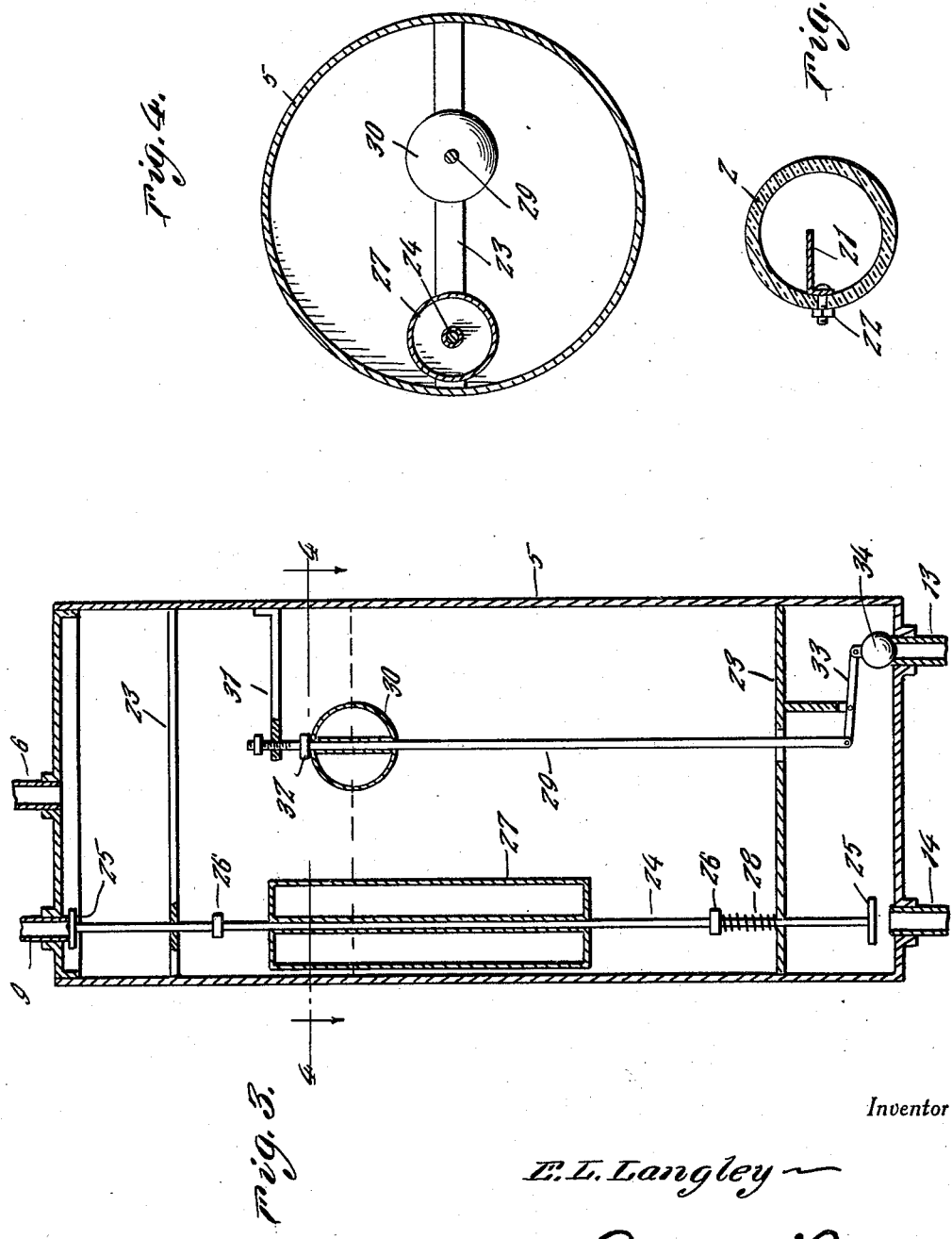

Patented June 7, 1932

1,862,224

UNITED STATES PATENT OFFICE

EARNEST LEE LANGLEY, OF SWEETWATER, TEXAS

APPARATUS FOR DECOMPOSING WATER

Application filed February 11, 1929. Serial No. 339,157.

This invention relates to improvements in process and means for the decomposition of $H_2O$ by electrolysis. In carrying out the present process, let it be understood that while a constant current is desired in the electrolytic step, static electricity may be applied in a much less expensive manner and may be equally efficient for the purpose.

In using static electricity, the apparatus may be set in operation during storms when the clouds are highly charged with static electricity.

Under this condition, high aerial conductors may be employed for causing the delivery of the static charge to the apparatus.

The combustible nature of hydrogen has been long realized, but its liberation from affinitive bodies has been heretofore so costly as to prohibit the use thereof as a fuel for internal combustion engines. Therefore, the principal object of this invention is to provide an apparatus capable of generating hydrogen at extremely low cost, so that its use in internal combustion engines may be established.

Another object is to provide a process for liberating hydrogen from $H_2O$ in a quick and in relatively few operative steps.

Another object of the invention will become more apparent to the reader after considering the invention as described and claimed hereinafter.

In the drawings:—

Figure 1 is a substantially diagrammatic view disclosing the apparatus connected to a windmill generating plant.

Fig. 2 represents a vertical sectional view through the major portion of the apparatus.

Fig. 3 represents a vertical sectional view through one of the gas compressing tanks.

Fig. 4 is a horizontal sectional view of one of the gas compressing tanks, taken substantially on the line 4—4 of Fig. 3, and looking in the direction of the arrows.

Fig. 5 represents a horizontal sectional view through one of the insulating tubes in which the water is decomposed by electrical discharge.

Referring to the drawings, wherein like numerals designate like parts, the apparatus includes a supply tank 1 for containing a volume of electrolyte, which is a solution of nine parts of water to one part of sulphuric acid.

A pair of vertically disposed tubes 2—2, of suitable insulating material are arranged in spaced relation with respect to each other beneath the supply tank 1. These tubes are interconnected adjacent their lower ends by the conduit 3, while the pipe 4 extending downwardly from the supply tank 1 communicates at its lower end with the conduit 3, as is shown in Fig. 2, and the conduit 3 is of insulating material also.

A pair of gas compressing tanks 5—5 are provided, one of which is adjacent to each tube 2. A pipe line 6 extends from the upper end of each tube 2 to the upper end of the adjacent compressing tank 5, and is adapted to project downwardly within the tube 2 for a slight distance.

The pipe line 6 is provided with a valve 7 in its intermediacy and an air outlet valve 8 adjacent the end of the pipe extending into the tube 2.

Each compressing tank 5 has a pipe 9 extending therefrom at its upper end to communicate with a storage tank 10, preferably of the variable capacity type.

A water supply line 11 having a shut-off valve 12 therein, is provided with a lead pipe 13 extending to the bottom of each compressing tank 5.

Each compressing tank 5 has a discharge pipe 14 at its bottom terminating at its lower end below the normal overflow level of a basin 15.

Referring back to the tubes 2—2, it will be seen that each tube is provided with a pair of guides (in the form of spiders preferably), located respectively at the upper and lower portions of the tube, in the manner substantially shown in Fig. 2, and an elongated rod 17 is slidably disposed through the guides 16—16 and is provided with stops 18—18 respectively on opposite sides of a float 19, slidably mounted on the rod 17. The upper end of the rod 17 is equipped with a valve element 20 for closing the end of the pipe 6 projecting through the top of the tube 2.

An electrode 21 is provided within each tube 2 at the lower portion thereof, and through the tube walls having connection therewith, permits connection to the source of electricity.

Within each compressing tank 5 is located a suitable guide member 23 located slightly inwardly from each end thereof. An elongated rod 24 is slidably disposed through the guides 23 and is equipped at its ends with a valve element 25. A pair of spaced stops 26—26 are provided on the rod 24 inwardly from the guides 23—23, and between the stops 26—26 an elongated float 27 is slidably mounted on the rod 24. A coiled spring 28 is interposed between the lower guide 23 and the lowermost stop 26. The valve elements 25—25 are adapted for alternate closed relation with the end of the pipes 9 and 14 leading into the tank 5.

For closing the water supply lead pipe 13, a valve mechanism is shown in Fig. 3 and comprises an elongated rod 29 on which a float 30 is slidably mounted. The upper end of the rod 29 is slidably secured to a bracket 31 projecting from the wall of the tank. The float 30 is adapted to engage a stop member 32 at the upper end portion 29 for lifting the said rod, and rocking the arm 33 mounted at the bottom of the tank for lifting the ball 34 from seated position against the end of the lead pipe 13.

In Fig. 1, a windmill 35 is shown for driving a generator 36, for charging a battery 37. Current is supplied to the electrode 21 by leads from the battery 37.

In the operation of this apparatus, a volume of the solution before described is placed in the supply tank 1. The solution will rise in the tubes 2—2, resulting in the engagement of the stops 18 by the floats 19 and the subsequent closing of the pipe 6 at the end leading into the tube 2 by the valve element 20. This operation simultaneously occurs in each tube 2. The timer or in fact, any other switch mechanism may be employed in the ignition means (not shown in the drawings), which when closed will result in a discharge of current through the solution.

The liberated gas will rise to the upper interior of each tube 2, and will cause the displacement of the solution back through the pipe 4 toward the tank 1. A sufficient lowering of the solution level within each tube 2 will result in the disengagement of the float 19 from the stop 18 and the opening of the valve 20.

Prior to the opening of the valve 20, the tank 5 and the pipe 6 have been completely filled with water from the supply line 11, and the ball valve 34 in each tank 5, automatically positioned in closed respect to the lead pipes 13. Any air within the pipe 6 has been released through the relief valve 8 and the valve 8 subsequently closed. The gas within the tube 2 will act against the water column in the pipe 6 and the pressure against the water column will cause drain of the water within the tank 5 thru the drain pipe 14. As the gas increases, and expands into the tank 5, a sufficient quantity of the water therein will be displaced through the drain pipe 14 and the opening of the pipe 9 to the storage tank 10.

The greater pressure of the solution within the tube 2 will have displaced all the gas therefrom, resulting in the closing of the valve 20 prior to the opening of the ball valves 34 to permit the compressing of the gas within the tank 5 and its expulsion through the pipes 9 to the tanks 10. As soon as a sufficient volume of water is discharged into the tank 5, the upper valve 25 and the valves 34 will close, while the lower valve 25 will be disposed in an open position.

It is to be understood that although in Fig. 1, a windmill is shown as a prime mover for the generator 36, the windmill, generator and battery 37 may be all eliminated in favor of high aerial conductors for obtaining static electricity from the atmosphere, especially during stormy weather.

Certain changes in the construction of the various containers, and other details may be resorted to in the construction of this apparatus without departing from the spirit and scope of the invention as claimed hereinafter.

Having thus described my invention, what I claim as new is:—

In apparatus of the class described, an electrolyte supply tank, a discharge pipe leading therefrom, a plurality of branches leading from said discharge pipe, a generating chamber connected to each of said branch pipes and having communication therethrough with the electrolyte discharge pipe whereby the generating chambers are supplied with electrolyte, means in the generating chambers for decomposing the electrolyte therein to produce gas, and a valved outlet for each of said generating chambers, the valve of said outlet being opened and closed by a float riding upon the electrolyte level in the generating chambers, said valves being normally maintained in closed position whereby to trap the generated gases in the generating chambers until sufficient pressure is built up to displace the electrolyte from the generating chambers through the branch pipes and electrolyte discharge pipe and thereby lower the electrolyte level in the generating chambers.

In testimony whereof I affix my signature.

EARNEST LEE LANGLEY.